US006231942B1

(12) United States Patent
Blizard et al.

(10) Patent No.: US 6,231,942 B1
(45) Date of Patent: May 15, 2001

(54) METHOD AND APPARATUS FOR MICROCELLULAR POLYPROPYLENE EXTRUSION, AND POLYPROPYLENE ARTICLES PRODUCED THEREBY

(75) Inventors: Kent Blizard, Ashland; Srinath Tupil, Chelmsford; William Malavich, Lowell, all of MA (US)

(73) Assignee: Trexel, Inc., Woburn, MA (US)

( * ) Notice: Subject to any disclaimer, the term of this patent is extended or adjusted under 35 U.S.C. 154(b) by 0 days.

(21) Appl. No.: 09/010,289

(22) Filed: Jan. 21, 1998

(51) Int. Cl.$^7$ .............................. A47G 21/18; B32B 1/08; B32B 3/26
(52) U.S. Cl. .................. 428/36.5; 239/33; 428/36.92; 428/315.7; 521/79; 521/142; 521/143
(58) Field of Search .................... 239/33; 521/79, 521/142, 143; 428/36.5, 36.9, 36.92, 338, 315.5, 315.7

(56) References Cited

U.S. PATENT DOCUMENTS

| | | |
|---|---|---|
| 3,227,664 | 1/1966 | Blades et al. . |
| 3,227,784 | 1/1966 | Blades et al. . |
| 3,277,221 | 10/1966 | Parrish . |
| 3,375,211 | 3/1968 | Parrish . |
| 3,375,212 | 3/1968 | Bonner . |
| 3,384,531 | 5/1968 | Parrish . |
| 3,584,090 | 6/1971 | Parrish . |
| 3,607,796 | 9/1971 | Eberle et al. . |
| 3,637,458 | 1/1972 | Parrish . |
| 3,787,543 | 1/1974 | Parrish . |
| 3,812,225 | 5/1974 | Hosoda et al. . |
| 3,846,349 | 11/1974 | Harada et al. . |
| 4,298,706 | 11/1981 | Ueno et al. . |
| 4,352,892 | 10/1982 | Lohmar . |
| 4,442,232 | 4/1984 | Kajimura et al. . |
| 4,473,665 | 9/1984 | Martini-Vvedensky et al. . |
| 4,541,981 | * 9/1985 | Lowery et al. .................... 264/209.1 |
| 4,701,432 | * 10/1987 | Welborn, Jr. ......................... 502/113 |
| 4,761,256 | 8/1988 | Hardenbrook et al. . |
| 4,791,144 | 12/1988 | Nagou et al. . |

(List continued on next page.)

FOREIGN PATENT DOCUMENTS

| | | |
|---|---|---|
| 0 707 935 A2 | 4/1996 | (EP) . |
| 0 799 853 A1 | 10/1997 | (EP) . |
| 0 818 292 A2 | 1/1998 | (EP) . |
| WO 89/00918 | 2/1989 | (WO) . |
| WO 90/07546 | 7/1990 | (WO) . |
| WO 95/24440 | 9/1995 | (WO) . |
| WO 98/08667 | 3/1998 | (WO) . |
| WO 98/31521 | 7/1998 | (WO) . |

OTHER PUBLICATIONS

Baldwin, Daniel F. "A Processing System for The Extrusion of Microcellular Polymer Sheets: Shaping and Cell Growth Control", Cellular and Microcellular Materials, 53:85–107, 1994 (no month).

Park et al., "Filamentary Extrusion of Microcellular Polymers Using a Rapid Decompressive Element", Polymer Engineering and Science, 36:34–48, 1996 (no month).

Park et al., "Effect of the Pressure Drop Rate on Cell Nucleation in Continuous Processing of Microcellular Polymers", Polymer Engineering and Science, 35:432–440, 1995 (no month).

Primary Examiner—Blaine Copenheaver
(74) Attorney, Agent, or Firm—Wolf, Greenfield & Sacks, P.C.

(57) ABSTRACT

A polymeric foam article is comprised mainly of homopolymeric polypropylene, or unimodal polypropylene. The polymeric article can be microcellular, and can be formed into a drinking straw.

25 Claims, 6 Drawing Sheets

U.S. PATENT DOCUMENTS

| | | |
|---|---|---|
| 4,832,770 | 5/1989 | Nojiri et al. . |
| 4,940,736 | 7/1990 | Alteepping et al. . |
| 5,034,171 | 7/1991 | Kiczek et al. . |
| 5,110,998 | 5/1992 | Muschiatti . |
| 5,116,881 | 5/1992 | Park et al. . |
| 5,128,382 | 7/1992 | Elliott, Jr. et al. . |
| 5,149,579 | 9/1992 | Park et al. . |
| 5,158,986 | 10/1992 | Cha et al. . |
| 5,160,674 | 11/1992 | Colton et al. . |
| 5,180,751 | 1/1993 | Park et al. . |
| 5,182,307 | 1/1993 | Kumar . |
| 5,334,356 | 8/1994 | Baldwin et al. . |
| 5,358,675 | 10/1994 | Campbell et al. . |
| 5,500,450 | 3/1996 | Simandl et al. . |
| 5,527,573 | 6/1996 | Park et al. . |
| 5,571,848 | 11/1996 | Mortensen et al. . |
| 5,580,624 | 12/1996 | Andersen et al. . |
| 5,670,102 | 9/1997 | Perman et al. . |
| 5,684,055 | 11/1997 | Kumar et al. . |
| 5,830,393 | 11/1998 | Nishikawa et al. . |
| 5,866,053 | 2/1999 | Park et al. . |
| 5,955,511 | 9/1999 | Handa et al. . |

* cited by examiner

METHOD AND APPARATUS FOR MICROCELLULAR POLYPROPYLENE EXTRUSION, AND POLYPROPYLENE ARTICLES PRODUCED THEREBY

FIELD OF THE INVENTION

The present invention relates generally to polymeric foam processing, and more particularly to a continuous microcellular polymer extrusion system and method that allows extrusion of microcellular, standard-grade polypropylene. Polymer foam straws also are produced.

BACKGROUND OF THE INVENTION

Foamed polymeric materials are well known, and typically are produced by introducing a physical blowing agent into a molten polymeric stream, mixing the blowing agent with the polymer, and extruding the mixture into the atmosphere while shaping the mixture. Exposure to atmospheric conditions causes the blowing agent to gasify, thereby forming cells in the polymer. Under some conditions the cells can be made to remain isolated, and a closed-cell foamed material results. Under other, typically more violent foaming conditions, the cells rupture or become interconnected and an open-cell material results. As an alternative to a physical blowing agent, a chemical blowing agent can be used which undergoes chemical decomposition in the polymer material causing formation of a gas.

Foamed polyolefins are known. Of these, polyethylene is preferred because of ease of foaming control. While foams including polypropylene components are known, in most cases such foams include significant proportion of additives that add controlability to the foaming process.

U.S. Pat. No. 4,940,736 (Alteeping) describes a foamed product made by foaming a composition including a major proportion of a low viscosity polypropylene having a melt viscosity of less than $2 \times 10^3$ poise and a minor proportion of a high viscosity polypropylene having a melt viscosity of greater than $2.5 \times 10^3$ poise. Alteeping mentions that previously-proposed procedures for foaming polypropylene had suffered from severe disadvantages limiting their commercial application, noting specifically the following: U.S. Pat. No. 4,352,892 (Firma Carl Freudenberg), which discloses foaming a composition including crystalline polypropylene and a further component selected from polybutadiene, ethylene vinyl acetate copolymer, and ethylene-propylene terpolymer rubbers; U.S. Pat. No. 4,442,232 (Firma Carl Freudenberg) which discloses foams comprising crystalline polypropylene and polybutadiene that are cross-linked; U.S. Pat. No. 4,298,706 (Karengafuchi Dagaku Koguyo KK) which discloses foams of compositions comprising of polypropylene and polybutadiene kneaded together; U.S. Pat. No. 3,846,349 (Sumitomo Chemical Co.) which describes foam produced from a three-component mixture of crystalline polypropylene, non-crystalline propylene, and low density polyethylene; and U.S. Pat. No. 3,607,796 (Grunzweig and Hartmann AG) which describes a process for producing foam from a composition comprising high and low molecular weight polypropylene.

U.S. Pat. No. 5,180,751 (Park) describe polypropylene foam made of polypropylene resins having a z-average molecular weight above $1 \times 10^6$ and a z-average molecular weight/weight average molecular weight ratio above 3.0. Park states that unacceptable foam sheets show a unimodal molecular weight distribution, while resins which yield acceptable foam sheets show a bimodal molecular weight distribution.

U.S. Pat. No. 4,832,770 (Nojiri) describes a method of manufacturing a foamed polypropylene resin from a mixture of 80 to 20 weight percent of a crystalline polypropylene-ethylene block copolymer containing 20 weight percent or less of ethylene and having a melt index of two or less and 20 to 80 weight percent of a crystalline polypropylene-ethylene block or random copolymer containing 5 weight percent or less of ethylene and having a melt index of 6 to 20 or a polypropylene homopolymer having a melt index of 6 to 20.

One class polymer foams that can offer a variety of advantageous characteristics such as uniform cell size and structure, the appearance of solid plastic, etc. are microcellular foams. U.S. Pat. No. 4,473,665 (Martini-Vvedensky, et al.; Sep. 25, 1984) describes a process for making foamed polymer having cells less than about 100 microns in diameter. In the technique of Martini-Vvedensky, et al., a material precursor is saturated with a blowing agent, the material is placed under high pressure, and the pressure is rapidly dropped to nucleate the blowing agent and to allow the formation of cells. The material then is frozen rapidly to maintain a desired distribution of microcells.

U.S. Pat. No. 5,158,986 (Cha, et al.; Oct. 27, 1992) describes formation of microcellular polymeric material using a supercritical fluid as a blowing agent. In a batch process of Cha, et al., a plastic article is submerged at pressure in supercritical fluid for a period of time, and then quickly returned to ambient conditions creating a solubility change and nucleation. In a continuous process, a polymeric sheet is extruded, then run through rollers in a container of supercritical fluid at high pressure, and then exposed quickly to ambient conditions. In another continuous process, a supercritical fluid-saturated molten polymeric stream is established. The stream is rapidly heated, and the resulting thermodynamic instability (solubility change) creates sites of nucleation, while the system is maintained under pressure preventing significant growth of cells. The material then is injected into a mold cavity where pressure is reduced and cells are allowed to grow.

While polymer foams containing polypropylene exist, it would be advantageous, in terms of added simplicity and reduced cost, to be able to produce high-quality foams including polypropylene without the need for significant amounts of foam-controlability additives or other co-polymerized or blended polymer components. It is an object of the present invention to provide such articles.

SUMMARY OF THE INVENTION

The present invention provides methods and systems for producing polymeric polypropylene foam which can be microcellular material, and articles produced thereby.

In one aspect the invention provides extrusion systems. Specifically, an extruder is provided that has an inlet for receiving a precursor of a foamed polypropylene material at an inlet end thereof, and an outlet at an outlet end thereof for releasing foamed polypropylene material from the extruder. An enclosed passageway connects the inlet with the outlet. The passageway is constructed and arranged to contain a product of the mixture of a blowing agent which can be a supercritical fluid, in particular supercritical carbon dioxide, with molten polypropylene material to be foamed within the passageway and to maintain the product within the passageway. The product can be maintained within the passageway above the critical temperature and pressure of the supercritical fluid. A nucleator is associated with the passageway and is capable of nucleating the product in the passageway in the absence of auxiliary nucleating agent, although nucleating agent can be used. An orifice is provided between the inlet and the outlet and is fluidly connectable to a source of blowing agent which can be supercritical fluid. The system receives polypropylene having a unimodal molecular weight distribution or other polypropylene described below in connection with the articles of the invention.

In another aspect the invention provides a method. One method involves providing a polypropylene material to be foamed, selected among polypropylene described below with respect to articles of the invention, and mixing a blowing agent into the material to create a mixture. A homogeneous single-phase solution is created from the mixture that has a uniform concentration of blowing agent distributed therein. The homogeneous single-phase solution is nucleated, and then essentially immediately thereafter shaped to create a shaped extrudate. The shaped extrudate can be released into ambient conditions essentially immediately after shaping. Nucleation can take place by passing the single-phase solution through a constriction creating a rapid pressure drop due to friction.

In another aspect the invention provides articles. One article is a foamed microcellular polypropylene article having an average cell size of less than about 100 microns.

In another embodiment an article of the invention is a foamed polymeric article including at least about 80% by weight polypropylene having a unimodal molecular weight distribution.

In another embodiment the invention provides an article including foamed polymeric material including at least about 80% by weight homopolymeric polypropylene of viscosity of at least about $2.5 \times 10^3$ poise.

In another embodiment the invention provides a foam, polymeric drinking straw.

The invention also provides a foamed polymeric tubular article having a length-to-diameter ratio of at least about 10 and a wall thickness of no more than about 1.0 millimeters.

The invention also provides a foamed polymeric tubular article having a diameter-to-thickness ratio of from about 9:1 to about 50:1.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION OF THE INVENTION

Commonly-owned International patent application serial no. PCT/US97/15088, filed Aug. 26, 1997 is incorporated herein by reference.

The various embodiments and aspects of the invention will be better understood from the following definitions. As used herein, "nucleation" defines a process by which a homogeneous, single-phase solution of polymeric material, in which is dissolved molecules of a species that is a gas under ambient conditions, undergoes formations of clusters of molecules of the species that define "nucleation sites", from which cells will grow. That is, "nucleation" means a change from a homogeneous, single-phase solution to a mixture in which sites of aggregation of at least several molecules of blowing agent are formed. Nucleation defines that transitory state when gas, in solution in a polymer melt, comes out of solution to form a suspension of bubbles within the polymer melt. Generally this transition state is forced to occur by changing the solubility of the polymer melt from a state of sufficient solubility to contain a certain quantity of gas in solution to a state of insufficient solubility to contain that same quantity of gas in solution. Nucleation can be effected by subjecting the homogeneous, single-phase solution to rapid thermodynamic instability, such as rapid temperature change, rapid pressure drop, or both. Rapid pressure drop can be created using a nucleating pathway, defined below. Rapid temperature change can be created using a heated portion of an extruder, a hot glycerine bath, or the like. A "nucleating agent" is a dispersed agent, such as talc or other filler particles, added to a polymer and able to promote formation of nucleation sites from a single-phase, homogeneous solution. Thus "nucleation sites" do not define locations, within a polymer, at which nucleating agent particles reside. "Nucleated" refers to a state of a fluid polymeric material that had contained a single-phase, homogeneous solution including a dissolved species that is a gas under ambient conditions, following an event (typically thermodynamic instability) leading to the formation of nucleation sites. "Non-nucleated" refers to a state defined by a homogeneous, single-phase solution of polymeric material and dissolved species that is a gas under ambient conditions, absent nucleation sites. A "non-nucleated" material can include nucleating agent such as talc. A "polymeric material/blowing agent mixture" can be a single-phase, non-nucleated solution of at least the two, a nucleated solution of at least the two, or a mixture in which blowing agent cells have grown. "Essentially closed-cell" microcellular material is meant to define material that, at a thickness of about 100 microns, contains no connected cell pathway through the material. "Nucleating pathway" is meant to define a pathway that forms part of microcellular polymeric foam extrusion apparatus and in which, under conditions in which the apparatus is designed to operate (typically at pressures of from about 1500 to about 30,000 psi upstream of the nucleator and at flow rates of greater than about 10 pounds polymeric material per hour), the pressure of a single-phase solution of polymeric material admixed with blowing agent in the system drops below the saturation pressure for the particular blowing agent concentration at a rate or rates facilitating rapid nucleation. A nucleating pathway defines, optionally with other nucleating pathways, a nucleation or nucleating region of a device of the invention. "Reinforcing agent", as used herein, refers to auxiliary, essentially solid material constructed and arranged to add dimensional stability, or strength or toughness, to material. Such agents are typified by fibrous material as described in U.S. Pat. Nos. 4,643,940 and 4,426,470. "Reinforcing agent" does not, by definition, necessarily include filler or other additives that are not constructed and arranged to add dimensional stability. Those of ordinary skill in the art can test an additive to determine whether it is a reinforcing agent in connection with a particular material.

In preferred embodiments, the material of the invention is microcellular material and has average cell size of less than about 50 microns. In some embodiments particularly small cell size is desired, and in these embodiments material of the invention has average cell size of less than about 30 microns, more preferably less than about 20 microns, more preferably less than about 10 microns, and more preferably still less than about 5 microns. The microcellular material preferably has a maximum cell size of about 100 microns or preferably less than about 75 microns. In embodiments where particularly small cell size is desired, the material can have maximum cell size of about 50 microns, more preferably about 35 microns, and more preferably still about 25 microns. A set of embodiments includes all combinations of these noted average cell sizes and maximum cell sizes. For example, one embodiment in this set of embodiments includes microcellular material having an average cell size of less than about 30 microns with a maximum cell size of about 50 microns, and as another example an average cell size of less than about 30 microns with a maximum cell size of about 35 microns, etc. That is, microcellular material designed for a variety of purposes can be produced having a particular combination of average cell size and a maximum cell size preferable for that purpose. Control of cell size is described in greater detail below.

Foam material of the invention has a void volume of at least about 5%, more preferably at least about 10%, more preferably at least about 15%, more preferably still at least about 20%, and more preferably still at least about 30% according to one set of embodiments. These set of embodiments allow significant reduction in consumption of polymeric material. In another set of embodiments the material has a void volume of at least about 50%, more preferably at least about 60%, more preferably at least about 70%, and more preferably still at least about 75%. Increasing cell density while maintaining essentially closed-cell, microcellular material where that material is desired can be achieved by using high pressure drop rates as described in international patent application serial no. PCT/US97/15088, referenced above. Void volume, in this context, means initial void volume, i.e, typically void volume immediately after extrusion and cooling to ambient conditions. That is, formation of foam material at a void volume of 50%, followed by compaction resulting in a void volume of 40%, is still embraced by the definition of material at 50% void volume in accordance with the invention.

The present invention provides systems and techniques for extrusion of standard-grade or nearly standard-grade polypropylene foam. Microcellular articles of the invention can be produced according to a variety of batch or continuous processes, such as those described in U.S. Pat. No. 5,158,986 of Cha, et al., or International Patent Application Serial No. PCT/US97/15088 of Anderson, et al., filed Aug. 26, 1997, each of which is incorporated herein by reference.

Figure 1:
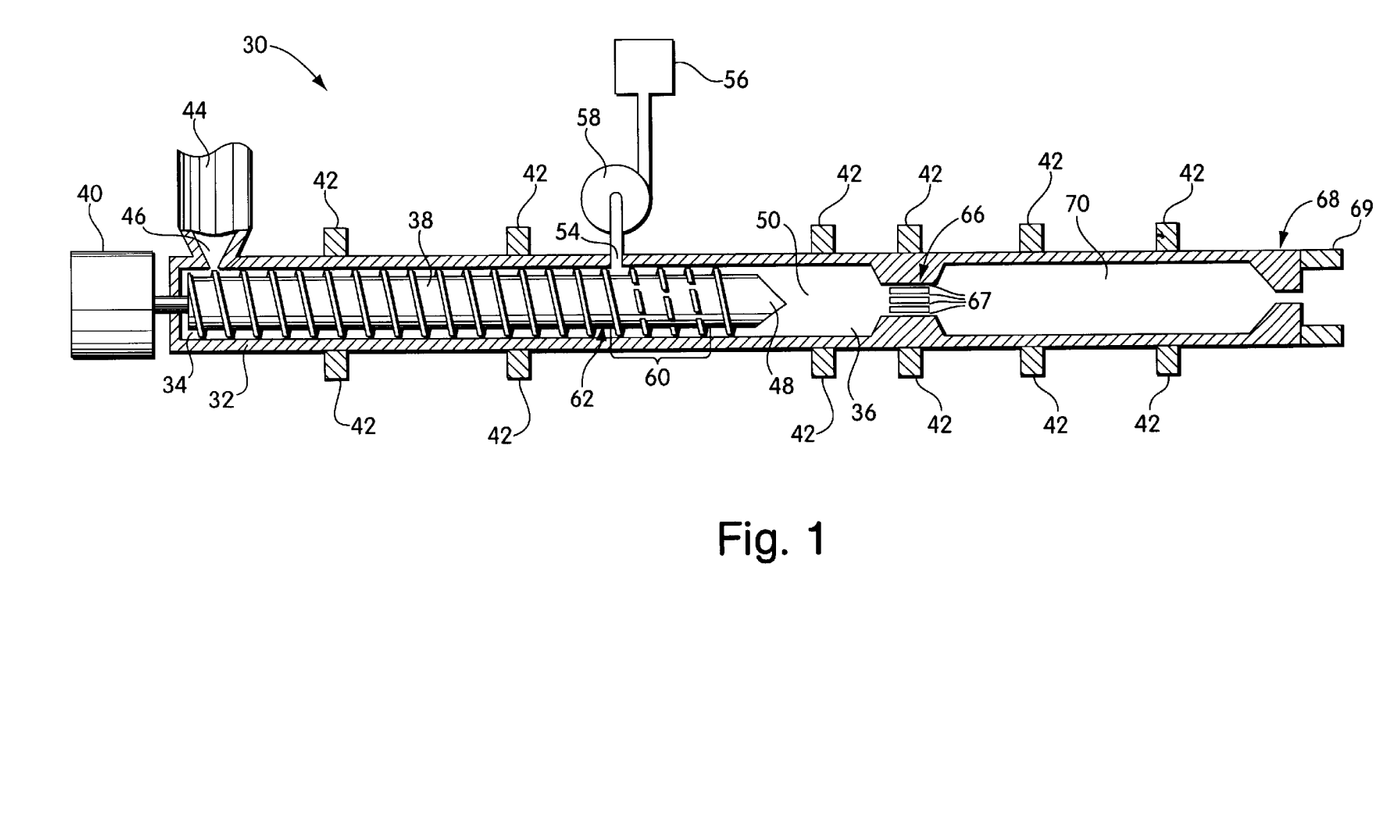
FIG. 1 is a schematic illustration of a polymeric extrusion system that can be used in accordance with one embodiment of the invention.
Figure 2:
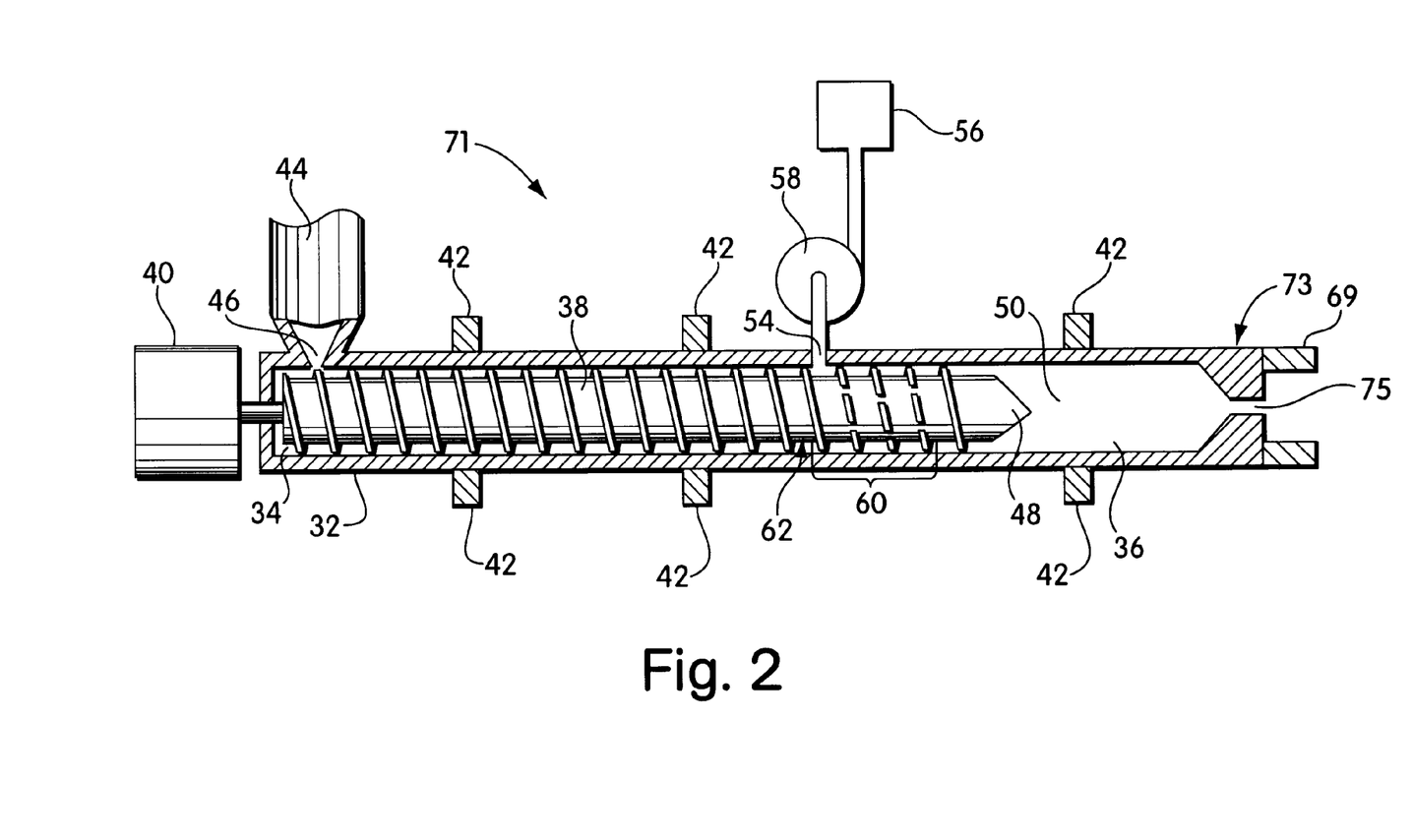
FIG. 2 is an alternative polymeric extrusion system that can be used in accordance with the invention.

FIGS. 1 and 2 describe extrusion systems that can be used in polypropylene foaming according to the present invention. Referring to FIG. 1, an extrusion system 30 includes a barrel 32 having a first, upstream end 34 and a second, downstream end 36. Mounted for rotation within barrel 32 is an extrusion screw 38 operably connected, at its upstream end, to a drive motor 40. Although not shown in detail, extrusion screw 38 includes feed, transition, gas injection, mixing, and metering sections.

Positioned along extrusion barrel 32, optionally, are temperature control units 42. Control units 42 can be electrical heaters, can include passageways for temperature control fluid, or the like. Units 42 can be used to heat a stream of pelletized or fluid polymeric material within the extrusion barrel to facilitate melting, and/or to cool the stream to control viscosity, skin formation and, in some cases, blowing agent solubility. The temperature control units can operate differently at different locations along the barrel, that is, to heat at one or more locations, and to cool at one or more different locations. Any number of temperature control units can be provided.

Extrusion barrel 32 is constructed and arranged to receive a precursor of polypropylene material. Typically, this involves a standard hopper 44 for containing pelletized polypropylene to be fed into the extruder barrel through orifice 46. Although preferred embodiments do not use chemical blowing agents, when chemical blowing agents are used they typically are compounded in polymer pellets introduced into hopper 44.

Immediately downstream of the downstream end 48 of screw 38 in FIG. 1 is a region 50 which can be a temperature adjustment and control region, auxiliary mixing region, auxiliary pumping region, or the like. For example, region 50 can include temperature control units to adjust the temperature of a fluid polymeric stream prior to nucleation, as described below. Region 50 can include instead, or in addition, standard mixing units (not shown), or a flow-control unit such as a gear pump (not shown). In another embodiment, region 50 is replaced by a second screw of a tandem extrusion apparatus, the second screw optionally including a cooling region.

Any of a wide variety of blowing agents can be used in connection with the present invention. Preferably, a physical blowing agent (a blowing agent that is a gas under ambient conditions) or mixture of physical blowing agents is used and, in this case, along barrel 32 of system 30 is a port 54 in fluid communication with a source 56 of a physical blowing agent. Physical blowing agents known to those of ordinary skill in the art such as hydrocarbons, chlorofluorocarbons, nitrogen, carbon dioxide, and the like can be used in connection with this embodiment of the invention and, according to a preferred embodiment, source 56 provides an atmospheric blowing agent, most preferably carbon dioxide. A pressure and metering device 58 typically is provided between blowing agent source 56 and port 54. Supercritical fluid blowing agents are especially preferred, in particular supercritical carbon dioxide. Suitable chemical blowing agents include those typically relatively low molecular weight organic compounds that decompose at a critical temperature or another condition achievable in extrusion and release a gas or gases such as nitrogen, carbon dioxide, or carbon monoxide. Examples include azo compounds such as azo dicarbonamide. Where a chemical blowing agent is used, the blowing agents can be introduced into systems of a invention by being compounded within polymer pellets feed into the system, or other techniques available to those of ordinary skill in the art. Device 58 can be used to meter the blowing agent so as to control the amount of the blowing agent in the polymeric stream within the extruder to maintain a level of blowing agent at a level, according to one set of embodiments, between about 1% and 15% by weight, preferably between about 3% and 12% by weight, more preferably between about 5% and 10% by weight, more preferably still between about 7% and 9% by weight, based on the weight of the polymeric stream and blowing agent. In other embodiments it is preferred that lower levels of blowing agent be used. As described in PCT/US97/15088, referenced above, different levels of blowing agent are desirable under different conditions and/or for different purposes which can be selected in accordance with the invention.

The pressure and metering device can be connected to a controller (not shown) that also is connected to drive motor 40 and/or a drive mechanism of a gear pump (not shown) to control metering of blowing agent in relationship to flow of polymeric material to very precisely control the weight percent blowing agent in the fluid polymeric mixture.

Although port 54 can be located at any of a variety of locations along the extruder barrel, according to a preferred embodiment it is located just upstream from a mixing section 60 of the extrusion screw and at a location 62 of the screw where the screw includes unbroken flights.

In a preferred embodiment of the blowing agent port system, two ports on opposing top and bottom sides of the barrel are provided. In this preferred embodiment, port 54 is located at a region upstream from mixing section of screw 38 (including highly-broken flights) at a distance upstream of the mixing section of no more than about 4 full flights, preferably no more than about 2 full flights, or no more than full flight. Positioned as such, injected blowing agent is very rapidly and evenly mixed into a fluid polymeric stream to quickly produce a single-phase solution of the foamed material precursor and the blowing agent.

Port 54, in the preferred embodiment is a multi-hole port including a plurality of orifices connecting the blowing agent source with the extruder barrel. In preferred embodiments a plurality of ports 54 are provided about the extruder barrel at various positions radially and can be in alignment longitudinally with each other. For example, a plurality of ports 54 can be placed at the 12 o'clock, 3 o'clock, 6 o'clock, and 9 o'clock positions about the extruder barrel, each including multiple orifices. In this manner, where each orifice is considered a blowing agent orifice, the invention includes extrusion apparatus having at least about 10, preferably at least about 40, more preferably at least about 100, more preferably at least about 300, more preferably at least about 500, and more preferably still at least about 700 blowing agent orifices in fluid communication with the extruder barrel, fluidly connecting the barrel with a source of blowing agent.

Also in preferred embodiments is an arrangement in which the blowing agent orifice or orifices are positioned along the extruder barrel at a location where, when a preferred screw is mounted in the barrel, the orifice or orifices are adjacent full, unbroken flights. In this manner, as the screw rotates, each flight, passes, or "wipes" each orifice periodically. This wiping increases rapid mixing of blowing agent and fluid foamed material precursor by, in one embodiment, essentially rapidly opening and closing each orifice by periodically blocking each orifice, when the flight is large enough relative to the orifice to completely block the orifice when in alignment therewith. The result is a distribution of relatively finely-divided, isolated regions of blowing agent in the fluid polymeric material immediately upon injection and prior to any mixing. In this arrangement, at a standard screw revolution speed of about 30 rpm, each orifice is passed by a flight at a rate of at least about 0.5 passes per second, more preferably at least about 1 pass per second, more preferably at least about 1.5 passes per second, and more preferably still at least about 2 passes per second. In preferred embodiments, orifices are positioned at a distance of from about 15 to about 30 barrel diameters from the beginning of the screw (at upstream end 34).

The described arrangement facilitates a method of the invention that is practiced according to one set of embodiments. The method involves introducing, into fluid polymeric material flowing at a rate of at least about 40 lbs/hr., a blowing agent that is a gas under ambient conditions and, in a period of less than about 1 minute, creating a single-phase solution of the blowing agent fluid in the polymer. The blowing agent fluid is present in the solution in an amount of at least about 2.5% by weight based on the weight of the solution in this arrangement. In preferred embodiments, the rate of flow of the fluid polymeric material is at least about 60 lbs/hr., more preferably at least about 80 lbs/hr., and in a particularly preferred embodiment greater than at least about 100 lbs/hr., and the blowing agent fluid is added and a single-phase solution formed within one minute with blowing agent present in the solution in an amount of at least about 3% by weight, more preferably at least about 5% by weight, more preferably at least about 7%, and more preferably still at least about 10% (although, as mentioned, in a another set of preferred embodiments lower levels of blowing agent are used). In these arrangements, at least about 2.4 lbs per hour blowing agent, preferably $CO_2$, is introduced into the fluid stream and admixed therein to form a single-phase solution. The rate of introduction of blowing agent is matched with the rate of flow of polymer to achieve the optimum blowing agent concentration.

In the embodiment illustrated in FIG. 1, a system is provided having a multi-channel nucleator 66, including nucleating pathways, located substantially upstream of shaping die 68. As used herein, "nucleating pathway" is meant to define a pathway that forms part of microcellular polymer foam extrusion apparatus and in which, under conditions in which the apparatus is designed to operate (typically at pressures of from about 1500 to about 30,000 psi upstream of the nucleator and at flow rates of greater than about 10 lbs polymeric material per hour), the pressure of a single-phase solution of polymeric material admixed with blowing agent in the system drops below the saturation pressure for the particular blowing agent concentration at a rate or rates facilitating nucleation. A nucleating pathway defines, optionally with other nucleating pathways, a nucleation or nucleating region of an extruder.

In one preferred embodiment, nucleator 66 has a polymer receiving end in fluid communication with the extrusion barrel, constructed and arranged to receive a fluid, non-nucleated, single-phase solution of polymeric material and blowing agent supplied by the barrel. The nucleator includes a nucleated polymer releasing end in communication with residence chamber 70 constructed and arranged to contain nucleated polymeric material under conditions controlling cell growth, and a fluid pathway connecting the receiving end to the releasing end. The arrangement allows for injecting blowing agent and maintaining the fluid stream, downstream of injection and upstream of nucleation, under pressure varying by no more than about 1,000 psi, preferably no more than about 750 psi, and more preferably still no more than about 500 psi. The fluid pathway of the nucleator has length and cross-sectional dimensions that subject the single-phase solution, as a flowing stream, to conditions of solubility change sufficient to create sites of nucleation at the microcellular scale in the absence of auxiliary nucleating agent. "At the microcellular scale" defines a cell density that, with controlled foaming, can lead to microcellular material. While nucleating agent can be used in some embodiments, in other embodiments no new nucleating agent is used. In either case, the pathway is constructed so as to be able to create sites of nucleation in the absence of nucleating agent whether or not nucleating agent is present. In particular, the fluid pathway has dimensions creating a desired pressure drop rate through the pathway. In one set of embodiments, the pressure drop rate is relatively high, and a wide range of pressure drop rates are achievable. A pressure drop rate can be created, through the pathway, of at least about 0.1 GPa/sec in molten polymeric material admixed homogeneously with about 6 wt % $CO_2$ passing through the pathway of a rate of about 40 pounds fluid per hour. Preferably, the dimensions create a pressure drop rate through the pathway of from about 0.2 GPa/sec to about 1.5 GPa/sec, or from about 0.2 GPa/sec to about 1 GPa/sec. The nucleator is constructed and arranged to subject the flowing stream to a pressure drop at a rate sufficient to create sites of nucleation at a density of at least about $10^7$ sites/cm$^3$. Preferably at least about $10^8$ sites/cm$^3$.

The arrangement of FIG. 1, or a similar arrangement that involves a single-channel nucleator located immediately upstream of shaping in association with a die, is constructed and arranged to continuously nucleate a fluid stream of single-phase solution of polymeric material and flowing agent flowing at a rate of at least 20 lbs/hour, preferably at least about 40 lbs/hour, more preferably at least about 60 lbs/hour, more preferably at least about 80 lbs/hour, and more preferably still at least about 100 lbs/hour. In FIG. 1 nucleation takes place significantly upstream of shaping. In the working examples below, nucleation takes place very closely upstream of final release and shaping. Any arrangement can serve as a nucleator that subjects a flowing stream of a single-phase solution of foamed material precursor and blowing agent to a solubility change sufficient to nucleate the blowing agent. This solubility change can involve a rapid temperature change, a rapid pressure change, for example caused by forcing material through an orifice where the rapid pressure drop takes place due to friction between the material and the orifice wall, or a combination, and those of ordinary skill in the art will recognize a variety of arrangements for achieving nucleation in this manner. A rapid pressure drop to cause nucleation is preferred. Where a rapid temperature change is selected to achieve nucleation, temperature control units can be provided about nucleator 66. Nucleation by temperature control is described in U.S. Pat. No. 5,158,986 (Cha., et al.) incorporated herein by reference. Temperature control units can be used alone or in combination with a fluid pathway of nucleator 66 creating a high pressure drop rate in fluid polymeric material flowing therethrough.

The described arrangement allows for creation of a single-phase solution at high flow rates. In particular, the arrangement allows for establishing the stream of fluid polymeric material flowing in the extradite at a rate of at least 60 lbs/hour and introducing $CO_2$ blowing agent at a rate of at least 1 lb/hour into the stream at an injection location to create a fluid stream including at least about 2.5% $CO_2$ by weight.

While creation of open-cell material is desirable for a variety of products, closed-cell microcellular polypropylene is preferred in the present invention. To achieve rapid pressure drop to create microcellular material, while foaming controllably to maintain closed-cell material, nucleating should be separated from shaping by a distance sufficient to achieve this control.

Also illustrated in FIG. 1 is an optional shaping element 69 downstream of shaping die 68. Shaping element 69 can provide further control over the thickness or shape of an extruded product by restricting expansion, further cooling the extradite (via, for example, fluid cooling channels or other temperature control units in element 69, not shown), or a combination. Without element 69, extradite is extruded into ambient conditions upon emergence from shaping die 68 (restricted only by polymeric extradite downstream of the exit of the shaping die). With element 69, the extradite generally emerges from shaping die into conditions of pressure slightly above ambient.

With reference to FIG. 1, several arrangements of the invention are described. In one, polymeric extradite emerges from a nucleating pathway into ambient conditions and, where multi-channel nucleation is used, is recombined there. This would involve elimination of components downstream of nucleator 66. In another arrangement, only forming element 69 exists downstream of the nucleator. In another, the system includes nucleator 66, an enclosure downstream thereof (chamber 70) and a constriction at the end of the chamber (forming die 68). In still another, the system includes nucleator 66, chamber 70, forming die 68, and forming element 69, as illustrated in the complete system of FIG. 1. Described another way, the invention includes one or more constrictions constructed and arranged to define nucleating pathway(s) and one or more constrictions upstream and/or downstream of the nucleating pathway(s) that each optionally include temperature control and/or shaping capability. The system produces extruded article in the shape of a continuous extrusion.

Referring now to FIG. 2, an alternate extrusion system 71 of the invention is illustrated schematically, representative of the system described in the working examples below. System 71 includes a die 73 similar to die 68 of FIG. 1, but including an exit 75 that is of dimension creating a nucleating pathway. That is, a homogeneous, single-phase solution is created by the extruder in region 50 and, when urged through nucleating pathway 75, the homogeneous, single-phase solution is nucleated to form a nucleated fluid polymeric material which then is foamed and shaped optionally with the assistance of forming element 69.

Polypropylene foams of the present invention can be blown with a physical blowing agent such as carbon dioxide and thus, in preferred embodiments of the invention, the techniques of the invention do not require the added expense and complication of formulating a polymeric precursor to include a species that will react under extrusion conditions to form a blowing agent, especially the expense and complication of providing a copolymer component having chemically attached or grafted thereto a chemical blowing agent. Since foams blown with chemical blowing agents inherently include residual, unreacted chemical blowing agent after a final foam product has been produced, as well as chemical by-products of the reaction that forms a blowing agent, material of the present invention in this set of embodiments includes residual chemical blowing agent or reaction by-product of chemical blowing agent, in an amount less than that inherently found in articles blown with 0.1% by weight chemical blowing agent or more, preferably including residual chemical blowing agent or reaction by-product of chemical blowing agent in an amount less than that inherently found in articles blown with 0.05% by weight chemical blowing agent or more. In particularly preferred embodiments, the material is characterized by being essentially free of residual chemical blowing agent or free of reaction by-products of chemical blowing agent. That is, they include less residual chemical blowing agent or by-product than is inherently found in articles blown with any chemical blowing agent.

One advantage of embodiments in which a chemical blowing agent is not used or used in minute quantities is that recyclability of product is maximized. Use of a chemical blowing agent typically reduces the attractiveness of a polymer to recycling since residual chemical blowing agent and blowing agent by-products contribute to an overall non-uniform recyclable material pool.

In one set of preferred embodiments, a polypropylene foam is provided that has a unimodal molecular weight distribution. That is, the added expense and complication of formulating compositions including copolymers, blends, or the like that have multi-modal molecular weight distributions is not required. In particular, the foamed polymeric article of the invention in this set of embodiments includes at least about 80% by weight polypropylene having a unimodal molecular weight distribution. In more preferred embodiments the article includes at least about 90% by weight polypropylene having a unimodal molecular weight distribution, more preferably about 95%, and more preferably still the article consists essentially entirely or consists entirely of unimodal molecular weight distribution polypropylene. The unimodal or multi-modal characteristic of a polymer can be readily determined by those of ordinary skill in the art using, for example, high temperature gel permeation chromatography (GPC). For example, a Waters 150 CV GPC chromatograph may be used.

In another set of preferred embodiments the article is defined by foamed polymeric material including at least about 80% by weight homopolymeric polypropylene of viscosity of at least about $2.5 \times 10^3$ poise. This embodiment also avoids complication of significant copolymerization or blending of auxiliary components. In preferred embodiments, at least about 90% by weight homopolymeric polypropylene of viscosity of at least about $2.5 \times 10^3$ poise is used, more preferably at least about 95% by weight, and more preferably still the foamed article consists essentially entirely of or consists entirely of homopolymeric polypropylene of viscosity of at least about $2.5 \times 10^3$ poise.

In accordance with each of these sets of preferred embodiments, the polypropylene article is preferably at least about 80% free of cross-linking, more preferably at least about 90% free of cross-linking, or more preferably still essentially entirely free of cross-linking.

Preferred embodiments include all sets of combinations of the above. For example, the article of the invention can include at least about 80% by weight homopolymeric polypropylene of viscosity of at least about $2.5 \times 10^3$ poise that also is unimodal and is microcellular, or can consist entirely of homopolymeric polypropylene having a unimodal molecular weight distribution and a viscosity of at least about $2.5 \times 10^3$ poise and a maximum cell size of about 50 microns and an average cell size of about 30 microns and being at least about 90% free of cross-linking, etc.

Very thin product, such as sheet, can be made in accordance with the invention, including tubes and other thin articles. According to this aspect of the invention, microcellular material, preferably essentially closed-cell material, of thickness less than about 4 mm, preferably less than about 3 mm, more preferably less than about 1 mm is produced. In some embodiments extremely thin microcellular material is produced, namely material of less than about 0.5 mm in thickness, more preferably less than about 0.25 mm in thickness, more preferably still less than about 0.2 mm in thickness. In some particularly preferred embodiments material on the order of 0.1 mm in thickness is produced. All of these embodiments can include essentially closed-cell material.

Thin product can be formed into a tubular configuration having, for example, a length-to-diameter ratio of at least 10 and wall thicknesses as described above. The length-to-diameter ratio can be at least about 15 in preferred embodiments, more preferably at least about 20, more preferably at least about 30, and more preferably still at least about 50. In another embodiment the article is a tubular article having a diameter-to-thickness ratio of from about 9:1 to about 50:1, more preferably from about 20:1 to about 40:1 and more preferably still about 30:1.

In a particularly preferred embodiment the present invention finds particular use in the fabrication of drinking straws. Those of ordinary skill in the art, and indeed the average consumer, will understand that drinking straws, used especially in connection with fast-food sales, must have at least the minimum rigidity, force/deflection value, and columnar strength without collapse, to puncture a perforated opening in a fast-food beverage cup lid and to withstand internal vacuum associated with drinking a relatively viscous beverage such as a milk shake through a straw. It is a feature of the present invention that foam articles can both be fabricated at a thickness of a drinking straw, and possesses the necessary physical properties for drinking straws according to these commercial requirements. Accordingly, in the one aspect the invention provides a foam polymeric drinking straw. Use of a foam polymeric drinking straw both reduces the raw material needed to produce the straw, and provides the straw with opacity and white appearance that is desired in the case of many drinking straws. One way to add opacity to a drinking straw is to add pigment. However, pigmented polymeric material is less amenable to recycling. The present invention provides thin, opaque, drinking straws that include less than about 1% by weight auxiliary opacifer, preferably less than about 0.05% by weight auxiliary opacifer, and more preferably still material that is essentially free of auxiliary opacifer. "Auxiliary opacifer", in the present invention, is meant to define pigments, dyes, or other species that are designed specifically to absorb light, or talc or other materials that can block or diffract light. Those of ordinary skill in the art can test whether an additive is an opacifer. Microcellular straws of the invention have the appearance of essentially solid, white, plastic articles, which offers significant commercial appeal. In other embodiments, an opacifier can be added.

Good toughness in the articles of the invention is achieved without necessity of reinforcing agents. Preferably, the articles of the invention have less than about 10% reinforcing agent by weight, more preferably less than about 5% reinforcing agent, more preferably still less than about 2% reinforcing agent, and in particularly preferred embodiments the articles of the invention are essentially free of reinforcing agent. "Reinforcing agent", as used herein, refers to auxiliary, essentially solid material constructed and arranged to add dimensional stability, or strength or toughness, to material. Such agents are typified by fibrous material as described in U.S. Pat. Nos. 4,643,940 and 4,426,470. "Reinforcing agent" does not, by definition, include filler, colorant, or other additives that are not constructed and arranged to add dimensional stability. Since reinforcing agents are added to increase dimensional stability, they typically are rod-like in shape or otherwise shaped to have a ratio, of a maximum dimension to a minimum dimension (length to diameter in the case of a rod or fiber) of at least about 3, preferably at least about 5, more preferably at least about 10.

The function and advantage of these and other embodiments of the present invention will be more fully understood from the examples below. The following examples are intended to illustrate the benefits of the present invention, but do not exemplify the full scope of the invention.

EXAMPLE 1

Extrusion of Microcellular Homopolymer Polypropylene Material Having a Fractional Melt Flow Rate A tandem extrusion line (Akron Extruders, Canal Fulton, Ohio) was arranged including a 2 inch, 32/1 L/D primary extruder and a 2.5 inch, 34/1 L/D secondary extruder. An injection system for injection of $CO_2$ into the primary was placed at a distance of approximately 20 diameters from the feed section. The injection system included 4 equally-spaced circumferentially, radially-positioned ports, each port including 176 orifices, each orifice of 0.02 inch diameter, for a total of 704 orifices.

The primary extruder was equipped with a two-stage screw including conventional first-stage feed, transition, and metering sections, followed by a multi-flighted (four flights) mixing section for blowing agent dispersion. The screw was designed for high-pressure injection of blowing agent with minimized pressure drop between the first-stage metering section and point of blowing agent injection. The mixing section included 4 flights unbroken at the injection ports so that the orifices were wiped (opened and closed) by the flights. At a screw speed of 80 RPM each orifice was wiped by a flight at a frequency of 5.3 wipes per second. The mixing section and injection system allowed for very rapid establishment of a single-phase solution of blowing agent and polymeric material.

The injection system included air-actuated control valve to precisely meter a mass flow rate of blowing agent at rates from 0.2 to 12 lbs/hr at pressures up to 5500 psi.

The secondary extruder was equipped with a deep channel, three-flighted cooling screw with broken flights, which provided the ability to maintain a pressure profile of microcellular material precursor, between injection of blowing agent and entrance to the point of nucleation (the die, in this case) varying by no more than about 1500 psi, and in most cases considerably less.

The system included instrumentation allowing measurement of pressure and temperature of the melt stream at least six locations throughout the tandem system between a location just prior to the blowing agent injection ports to the point of entry into the die to precisely monitor material conditions. Along the screw, melt temperature was measured with infrared equipment to avoid disruption of the melt stream.

PP pellets were gravity-fed from a hopper into the extrusion system. The grade used was a standard homopolymer resin (Montell 6823), having a nominal melt flow index of 0.5 g/ 10 min. Primary screw speed was 40 RPM, giving a total output of approximately 36 lbs/hr of material. Secondary screw speed was 13 RPM. Barrel temperatures of the secondary extruder were set to maintain a melt temperature of 380° F. measured at the end of the secondary extruder. $CO_2$ blowing agent was injected at a rate of 1.8 lbs/hr resulting in 5.0% blowing agent in the melt. Pressure profile between the injection ports and the inlet of the die was maintained between 2350 and 2780 psi. The die placed at the end of the secondary extruder was a circular orifice of constant cross section with a diameter of 0.080 inches and a length of 1.2 inches. The pressure drop rate across the die was approximately 1.1 GPa/s.

Figure 3:
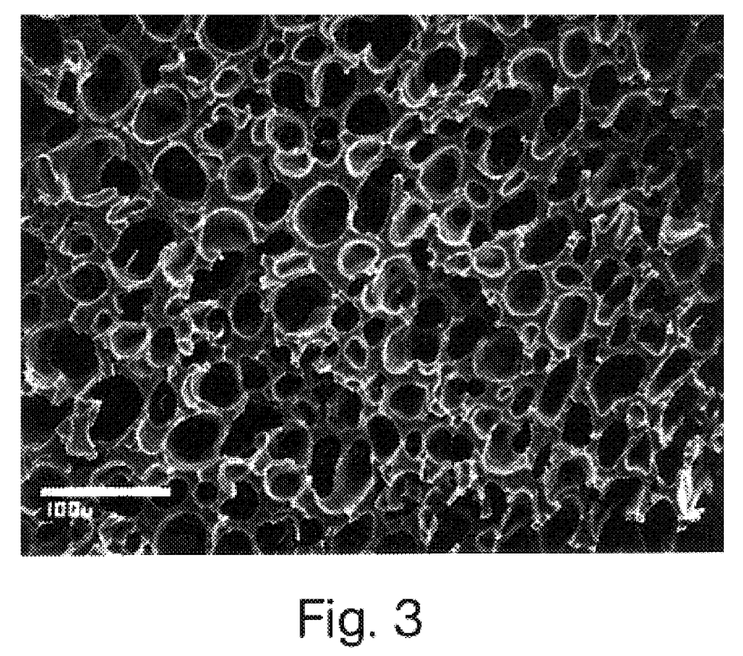
FIG. 3 is a photocopy of an SEM image of microcellular homopolymeric polypropylene foam of the invention.

FIG. 3 is a photocopy of an SEM image of the cross section of the extrudate, showing uniform, spherical, relatively closed cells, the majority of which were from 20 to 50 microns in diameter. Material density was approximately 0.35 g/cm$^3$ (19.3 lbs/ft$^3$), and cell density was approximately $3.7 \times 10^7$ cells/cm$^3$.

EXAMPLE 2

Extrusion of Microcellular Homopolymer Polypropylene Material Having Talc Filler System and parameters were used as in Example 1. PP pellets were gravity-fed from a hopper into the extrusion system. The grade used was a standard talc-filled homopolymer resin (Montell Astryn 65F4-4). The base resin had a nominal melt flow index of 4 g/ 10 min., and was filled with 40% by weight of talc. Primary screw speed was 60 RPM, giving a total output of approximately 63 lbs/hr of material. Secondary screw speed was 24 RPM. Barrel temperatures of the secondary extruder were set to maintain a melt temperature of 326° F. measured at the end of the secondary extruder. $CO_2$ blowing agent was injected at a rate of 2.0 lbs/hr resulting in 5.3% blowing agent in the melt. Pressure profile between the injection ports and the inlet of the die was maintained between 2560 psi and 3250 psi. The die placed at the end of the secondary extruder was a circular orifice of constant cross section with a diameter of 0.080 inches and a length of 1.2 inches. The pressure drop rate across the die was 1.7 GPa/s.

Figure 4:
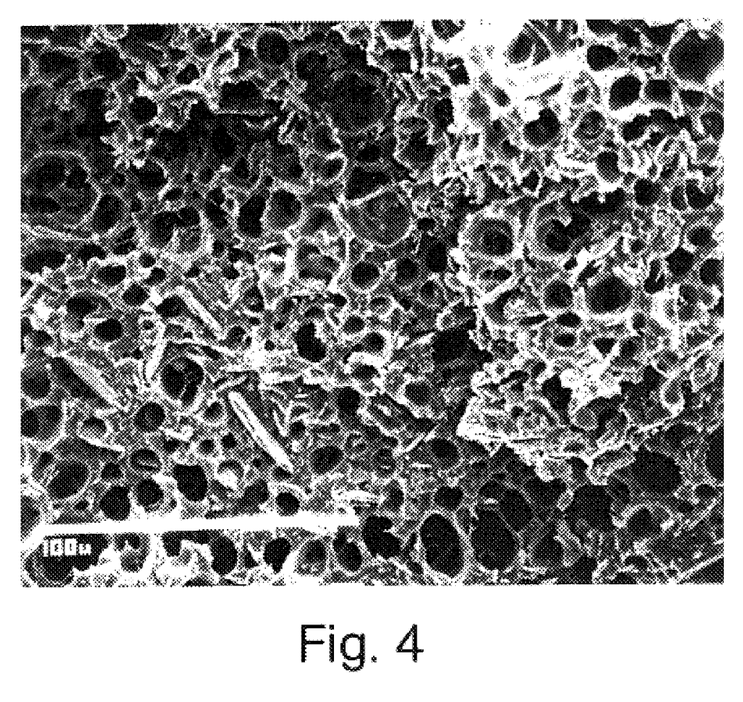
FIG. 4 is a photocopy of an SEM image of microcellular polypropylene extrudate of the invention.

FIG. 4 is a photocopy of an SEM image of the cross section of the extrudate, showing uniform, partially closed cells of an average of about 10 microns diameter, with a maximum size of about 30 microns diameter. Material density was approximately 0.61 g/cm3 (38 lbs/ft3), and cell density was approximately 1.0×109 cells/cm3.

EXAMPLE 3

Extrusion of Microcellular Homopolymer Polypropylene Low Density Sheet

System and parameters were used as in Example 1. PP pellets were gravity-fed from a hopper into the extrusion system. The grade used was a standard homopolymer resin (Montell 6823), having a nominal melt flow index of 0.5 g/10 min. Primary screw speed was 80 RPM, giving a total output of approximately 65 lbs/hr of material. Secondary screw speed was 20 RPM. Barrel temperatures of the secondary extruder were set to maintain a melt temperature of 328° F. measured at the end of the secondary extruder. $CO_2$ blowing agent was injected at a rate of 5.2 lbs/hr resulting in 80% blowing agent in the melt. Pressure profile between the injection ports and the inlet of the die was maintained between 2630 psi and 3880 psi. The system included, at the end of the secondary extruder, a die adapter and a cylindrical annular die with an exit gap of 0.053 inches with a diameter of 1.25 inches diverging from a nucleation gap of 0.022 thickness, 0.563 inch length, and diameter of 0.853 inch. The die adapter was equipped with taps for measurement of melt temperature and pressure just prior to entry into the die. The pressure drop rate across the die was 0.4 GPa/s.

Figure 5:
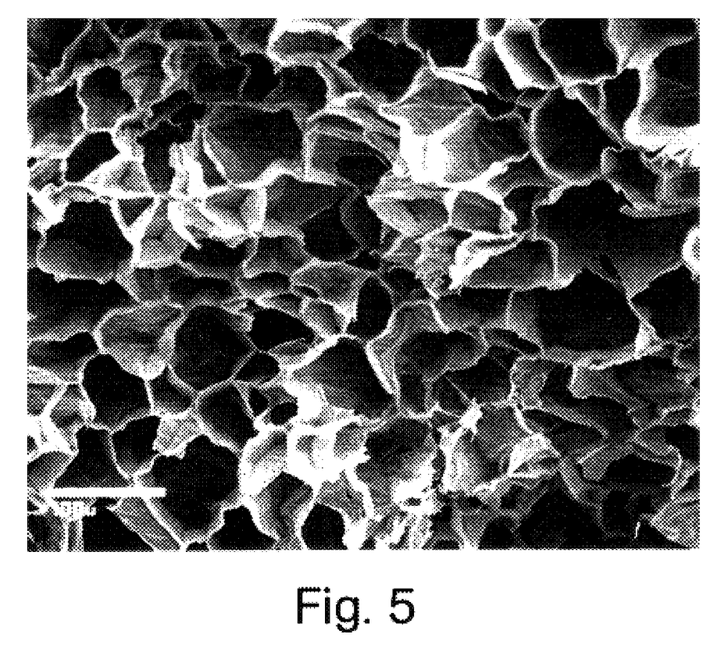
FIG. 5 is a photocopy of an SEM image of microcellular homopolymeric polypropylene of the invention.

FIG. 5 is a photocopy of an SEM image of the cross section of the extrudate, showing nominally hexagonal-shaped thin wall cells at least partially closed in structure. Average cell size was about 70 microns, with maximum size of 100 microns diameter. Material density was measured to be 0.13 g/cm$^3$ (8.1 lbs/ft$^3$), and cell density was approximately $1.7 \times 10^7$ cells/cm$^3$.

EXAMPLE 4
Microcellular Polypropylene Talc Filled Tubular Product

An NRM (Pawcatuck, CT) 2.5 inch 44/1 L/D long single extrusion line was equipped with an injection system for injection of $CO_2$ placed at a distance of approximately 25 diameters from the feed section. The injection system included 4 equally-spaced circumferentially, radially-positioned ports, each port including 417 orifices, each orifice of 0.02 inch diameter, for a total of 1668 orifices.

The extruder was equipped with a two-stage screw including conventional first-stage feed, barrier flight transition, and metering sections, followed by a multi-flighted (six flights) mixing section for blowing agent dispersion. The screw was designed for high-pressure injection of blowing agent with minimized pressure drop between the first-stage metering section and point of blowing agent injection. The second stage of the screw included a mixing section having 6 flights unbroken at the injection ports so that the orifices were wiped (opened and closed) by the flights. At a screw speed of 80 RPM each orifice was wiped by a flight at a frequency of 8 wipes per second. The mixing section and injection system allowed for very rapid establishment of a single-phase solution of blowing agent and polymeric material. The injection system included an air-actuated control valve to precisely meter a mass flow rate of blowing agent at rates from 0.2 to 50 lbs/hr at pressures up to 5500 psi.

The second stage of the screw was also equipped with a deep channel, three-flighted cooling section with broken flights, which provided the ability to cool the polymer melt stream.

The system included, at the end of the extruder, a die adapter and a cylindrical annular die with a gap of 0.34 inch, inner diameter of 0.4 inch, and land length of 2 inches. The die adapter was equipped with taps for measurement of melt temperature and pressure just prior to entry into the die.

The system included instrumentation allowing measurement of pressure and temperature of the melt stream at least 7 locations throughout the system between a location just prior to the blowing agent injection ports to the point of entry into the die to precisely monitor material conditions. Along the screw, melt temperature was measured with infrared equipment to avoid disruption of the melt stream.

A standard homopolymer polypropylene resin (Solvay HB 1301), having a nominal melt flow index of 5 g/10 min., was used as the base resin. Talc concentrate consisting of pellets having 40 percent by weight of talc dispersed in a homopolymer polypropylene matrix were blended with the HB 1301 using a loss-in-weight type blending system to produce a mixture containing 5% by weight of talc. This mixture was then gravity fed from a hopper into the extrusion system. Primary screw speed was 50 RPM, giving a total output of approximately 54 lbs/hr of material. Barrel temperatures were set to maintain a melt temperature of 422° F. measured at the end of the extruder. $CO_2$ blowing agent was injected at a rate of 0.3 lbs/hr resulting in 0.55% blowing agent in the melt. A die adapter was attached to the discharge of the extruder, connecting to a cylindrical annular die having a gap of 0.025 inches with an outer diameter of 0.18 inches and a land length of 0.15 inches. Pressure profile between the injection ports and the inlet of the die was maintained between 2430 and 3540 psi. The pressure drop rate across the die was 11.2 GPa/s.

Figure 6:
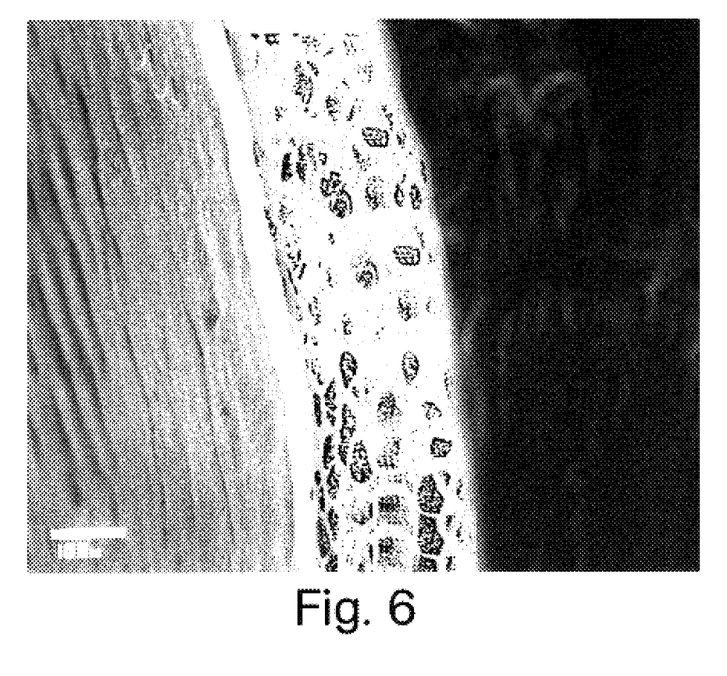
FIG. 6 is a photocopy of an SEM image of talc-filled tubular microcellular polypropylene of the invention.

FIG. 6 is a photocopy of an SEM image of the cross section of the extrudate, showing generally spherical cells approximately 50 microns in diameter dispersed throughout the cross section of the tube wall. Wall thickness of the product was approximately 0.008 inch (0.21 mm). Product outer diameter was about 0.26 inch (6.60 mm). Material density was approximately 0.51 g/cm$^3$ (32 lbs/ft$^3$), and cell density was approximately $2.0 \times 10^7$ cells/cm$^3$.

EXAMPLE 5
Microcellular Polypropylene Tubular Product with Talc and Color Concentrate System and parameters were used as in Example 4. A resin formulation having the same base PP resin grade as Example 4, but with 4% of $TiO_2$ pellet color concentrate and 3% talc was blended and gravity fed from a hopper into the extrusion system. Primary screw speed was 50 RPM, giving a total output of approximately 54 lbs/hr of material. Barrel temperatures were set to maintain a melt temperature of 404° F. measured at the end of the extruder. $CO_2$ blowing agent was injected at a rate of 0.3 lbs/hr resulting in 0.55% blowing agent in the melt. A die adapter was attached to the discharge of the extruder, connecting to a cylindrical annular die having a gap of 0.025 inches with an outer diameter of 0.18 inches and a land length of 0.15 inches. Pressure profile between the injection ports and the inlet of the die was maintained between 2710 and 3950 psi. The pressure drop rate across the die was 12.6 GPa/s.

Figure 7:
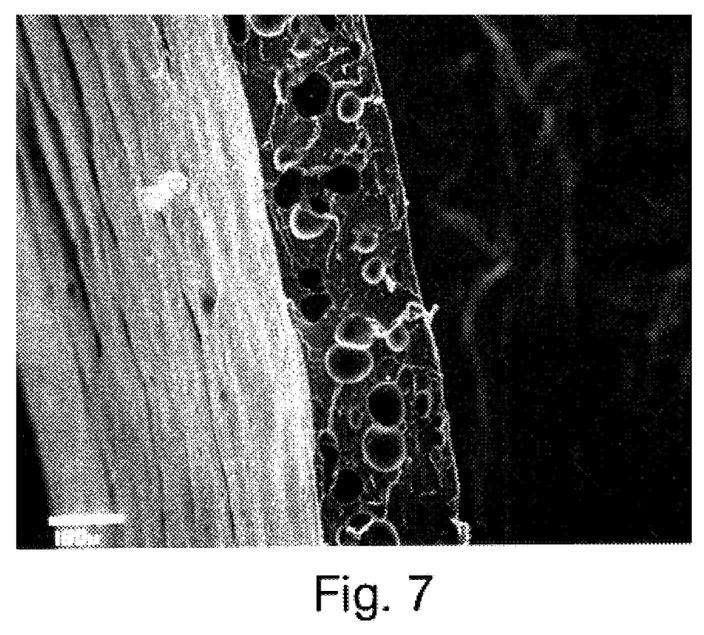
FIG. 7 is a photocopy of an SEM image of talc and color concentrate-filled tubular microcellular polypropylene of the invention.

FIG. 7 is a photocopy of an SEM image of the cross section of the extrudate, showing generally spherical cells approximately 35 microns in diameter dispersed throughout the cross section of the tube wall. Wall thickness of the product was approximately 0.007 inch (0.18 mm). Product outer diameter was about 0.26 inch (6.60 mm). Material density was approximately 0.57 g/cm$^3$ (36 lbs/ft$^3$), and cell density was approximately $5.2 \times 10^6$ cells/cm$^3$.

EXAMPLE 6
Microcellular Fractional Melt Flow Polypropylene Medium Density Sheet System and parameters were used as in Example 1, but with a 2.5 inch primary extruder and a 3 inch secondary extruder. PP pellets were gravity-fed from a hopper into the extrusion system. The grade used was a standard homopolymer resin (Montell 6823), having a nominal melt flow index of 0.5 g/10 min. Primary screw speed was 90 RPM, giving a total output of approximately p84 lbs/hr of material. Secondary screw speed was 5 RPM. Barrel temperatures of the secondary extruder were set to maintain a melt temperature of 386° F. measured at the end of the secondary extruder. $CO_2$ blowing agent was injected at a rate of 4.0 lbs/hr resulting in 4.8% blowing agent in the melt. A die adapter at the discharge of the secondary extruder was connected to a flat sheet T-type die having a die exit of 4.5 inches width and gap of 0.034 inch. A separate nucleator of constantly decreasing gap to an exit dimension of 0.015 inch was positioned within 0.5 inches of the die exit. The die had both melt and pressure indicators. Pressure profile between the injection ports and the inlet of the die was maintainted between 2120 and 3490 psi. The overall pressure drop rate across the die lips was 0.07 GPa/s.

Figure 8:
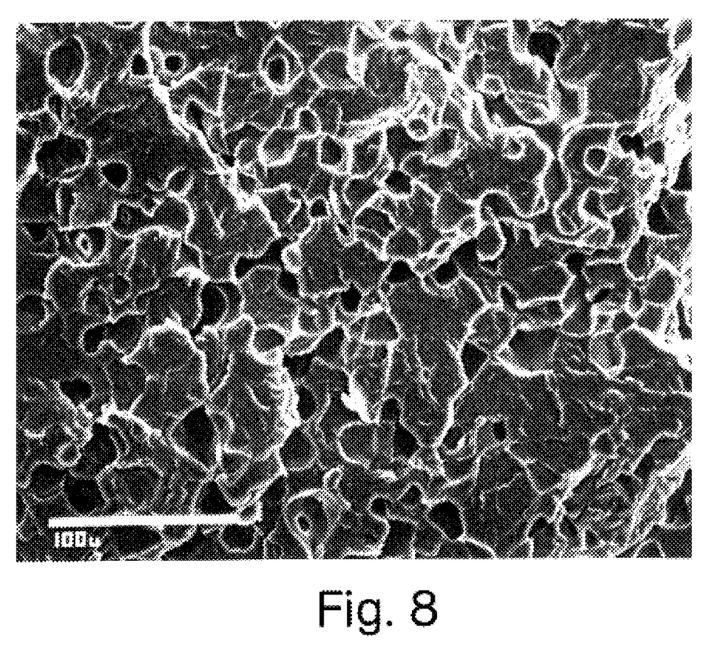
FIG. 8 is a photocopy of an SEM image of medium-density microcellular fractional melt flow polypropylene of the invention.

FIG. 8 is a photocopy of an SEM image of the cross section of the extrudate, showing a uniform dispersion of cells having an average diameter of about 25 microns. Material density was approximately 0.63 g/cm$^3$ (39 lbs/ft$^3$, and cell density was approximately 2.7×10$^7$ cells/cm$^3$.

EXAMPLE 7

Microcellular Polypropylene Medium Density Sheet

The extrusion system was identical to that of Example 6, with the exception of the die lip dimensions. PP pellets were gravity-fed from a hopper into the extrusion system. The grade used was a standard homopolymer resin (Solvay HB 3052), having a nominal melt flow index of 1.5 g/10 min. Primary screw speed was 50 RPM, giving a total output of approximately 100 lbs/hr of material. Secondary screw speed was 13 RPM. Barrel temperatures of the secondary extruder were set to maintain a melt temperature of 379° F. measured at the end of the secondary extruder. CO$_2$ blowing agent was injected at a rate of 5.5 lbs/hr resulting in 5.5% blowing agent in the melt. The die exit width was 10 inches, with a constant 5° included angle tapered exit of 0.5 inch length having and exit gap of 0.007 inch. Pressure profile between the injection ports and the inlet of the die was maintainted between 1960 and 2210 psi. The overall pressure drop rate across the die lips was 0.06 GPa/s.

Figure 9:
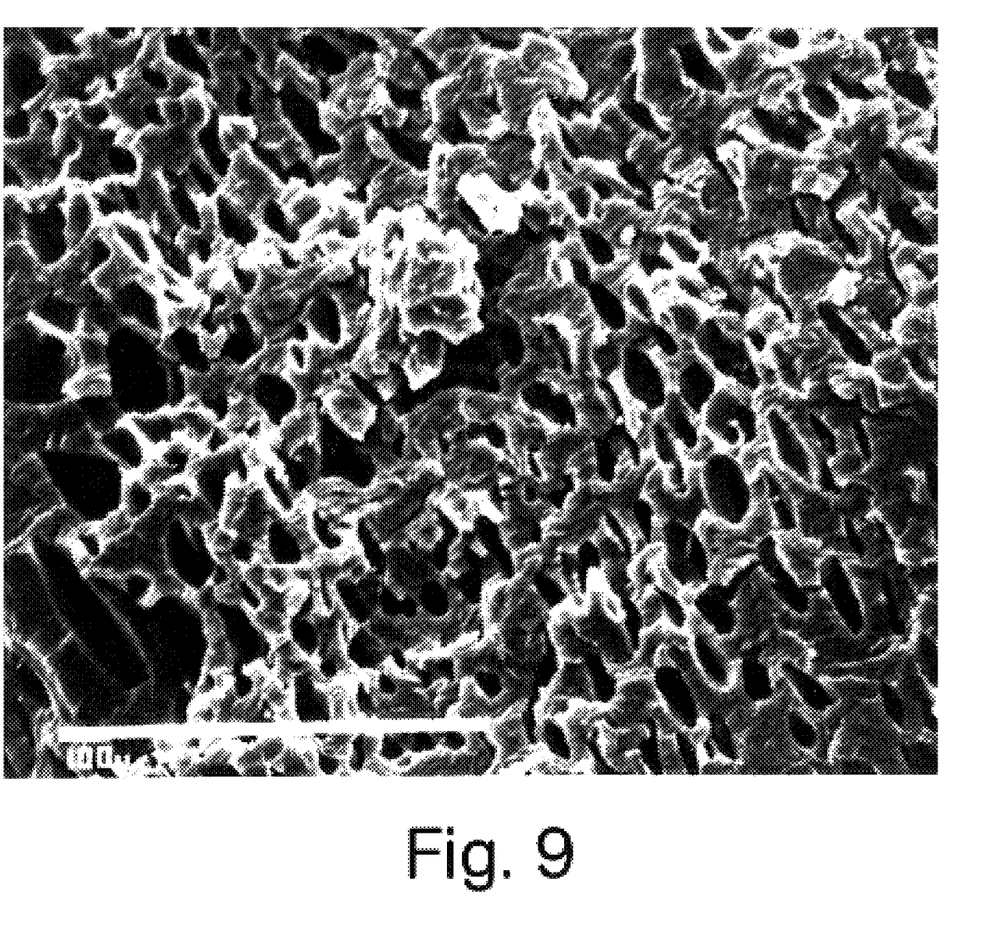
FIG. 9 is a photocopy of an SEM image of medium-density sheet microcellular polypropylene of the invention.

FIG. 9 is a photocopy of an SEM image of the cross section of the extrudate, showing small unifrom, homogeneously distributed cells of average diameter of approximately 10 microns. Material density was approximately 0.57 g/cm$^3$ (36 lbs/ft$^3$), and cell density was approximately 5.8×10$^8$ cells/cm$^3$.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. An article comprising foamed polymeric material including at least about 80% by weight polypropylene having a unimodal molecular weight distribution, and an average cell size of less than about 100 microns.

2. An article as in claim 1, consisting essentially of homopolymeric polypropylene having a unimodal molecular weight distribution and having a viscosity of at least about 2.5×10$^3$ poise.

3. An article as in claim 1, comprising foamed polymeric material including at least about 90% by weight polypropylene having a unimodal molecular weight distribution.

4. An article as in claim 1, comprising foamed polymeric material including at least about 95% by weight polypropylene having a unimodal molecular weight distribution.

5. An article as in claim 1, comprising foamed polymeric material consisting essentially of polypropylene having a unimodal molecular weight distribution.

6. An article as in claim 1, comprising foamed polymeric material consisting of polypropylene having a unimodal molecular weight distribution.

7. An article as in claim 1, formed as a drinking straw.

8. An article as in claim 1, having a length-to-diameter ratio of at least 10;1, a wall thickness of no more than 1.0 mm.

9. An article as in claim 1, comprising a foamed polymeric tubular article having a diameter-to-thickness ratio of from about 9:1 to about 50:1.

10. An article as in claim 1, comprising foamed polymeric material including at least about 80% by weight homopolymeric polypropylene of viscosity of at least about 2.5×10$^3$ poise.

11. An article as in claim 10, comprising the article including at least about 90% by weight homopolymeric polypropylene of viscosity of at least about 2.5×10$^3$ poise.

12. An article as in claim 10, comprising the article including at least about 95% by weight homopolymeric polypropylene of viscosity of at least about 2.5×10$^3$ poise.

13. An article as in claim 10, having a length-to-diameter ratio of at least 10:1, a wall thickness of no more than 1.0 mm.

14. An article as in claim 10, comprising a foamed polymeric tubular article having a diameter-to-thickness ratio of from about 9:1 to about 50:1.

15. An article as in claim 1, comprising foamed polymeric material consisting essentially of homopolymeric polypropylene of viscosity of at least about 2.5×10$^3$ poise.

16. An article as in claim 1, comprising foamed polymeric material consisting of homopolymeric polypropylene of viscosity of at least about 2.5×10$^3$ poise.

17. An article as in claim 1, comprising microcellular material.

18. An article as in claim 17, consisting essentially of microcellular polypropylene having a unimodal molecular weight distribution and a viscosity of at least about 2.5×10$^3$ poise.

19. An article as in claim 1, comprising a foam polymeric drinking straw.

20. An article as in claim 19, wherein the foam polymeric drinking straw comprises microcellular material.

21. An article as in claim 20, wherein the polymeric drinking straw includes at least about 90% by weight polypropylene having a unimodal molecular weight distribution.

22. An article as in claim 20, wherein the polymeric drinking straw includes at least about 80% by weight homopolymeric polypropylene of viscosity of at least about 2.5×10$^3$ poise.

23. An article as in claim 22, wherein the drinking straw includes at least about 95% by weight polypropylene having a unimodal molecular weight distribution.

24. An article as in claim 19, the article comprising a microcellular polymeric drinking straw consisting essentially of homopolymeric polypropylene having a unimodal molecular weight distribution and having a viscosity of at least about 2.5×10$^3$ poise.

25. An article as in claim 1, comprising a foamed polymeric tubular article having a length-to-diameter ratio of at least 10:1 and a wall thickness of no more than about 1.0 mm.

* * * * *